United States Patent
Itoh

(10) Patent No.: US 12,368,398 B2
(45) Date of Patent: Jul. 22, 2025

(54) MOTOR CONTROL APPARATUS AND IMAGE FORMING APPARATUS

(71) Applicant: CANON KABUSHIKI KAISHA, Tokyo (JP)

(72) Inventor: Masatoshi Itoh, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 142 days.

(21) Appl. No.: 18/068,676

(22) Filed: Dec. 20, 2022

(65) Prior Publication Data

US 2023/0238900 A1 Jul. 27, 2023

(30) Foreign Application Priority Data

Jan. 26, 2022 (JP) ................. 2022-010362

(51) Int. Cl.
*H02P 6/16* (2016.01)
*H02P 6/06* (2006.01)
*H02P 6/08* (2016.01)

(52) U.S. Cl.
CPC . *H02P 6/06* (2013.01); *H02P 6/08* (2013.01)

(58) Field of Classification Search
CPC .................................. H02P 6/06; H02P 6/08
USPC .................................................. 318/400.04
See application file for complete search history.

(56) References Cited

U.S. PATENT DOCUMENTS

| | | | |
|---|---|---|---|
| 2007/0075664 A1* | 4/2007 | Muroi | B41J 19/202 318/270 |
| 2014/0138217 A1* | 5/2014 | Hashimoto | B65H 29/125 198/788 |
| 2015/0145454 A1 | 5/2015 | Kameyama | |
| 2015/0246567 A1* | 9/2015 | Kawai | B41J 2/375 347/218 |
| 2016/0257323 A1* | 9/2016 | Meyer | B61L 27/12 |
| 2017/0082965 A1* | 3/2017 | Yamagishi | G03G 15/6532 |
| 2021/0373484 A1* | 12/2021 | Ohashi | G03G 15/757 |

FOREIGN PATENT DOCUMENTS

| | | |
|---|---|---|
| JP | H08223970 A | 8/1996 |
| JP | 2005010273 A | 1/2005 |
| JP | 2015104263 A | 6/2015 |
| JP | 2019126151 A | 7/2019 |
| JP | 2020089094 A | 6/2020 |

* cited by examiner

Primary Examiner — Erick D Glass
(74) Attorney, Agent, or Firm — ROSSI, KIMMS & McDOWELL LLP

(57) ABSTRACT

A motor control apparatus includes: a motor; a transmission mechanism configured to transmit a drive force of the motor to a load of the motor; and a control unit configured to, in case of stopping the motor being rotated at a first speed, decelerate the motor at least at a first deceleration in a first period, in which a rotation speed of the motor is decelerated from the first speed to a second speed lower than the first speed, and decelerate the motor at least at a second deceleration in a second period, in which the motor is decelerated from the second speed until stop, wherein the second deceleration is less than the first deceleration.

21 Claims, 11 Drawing Sheets

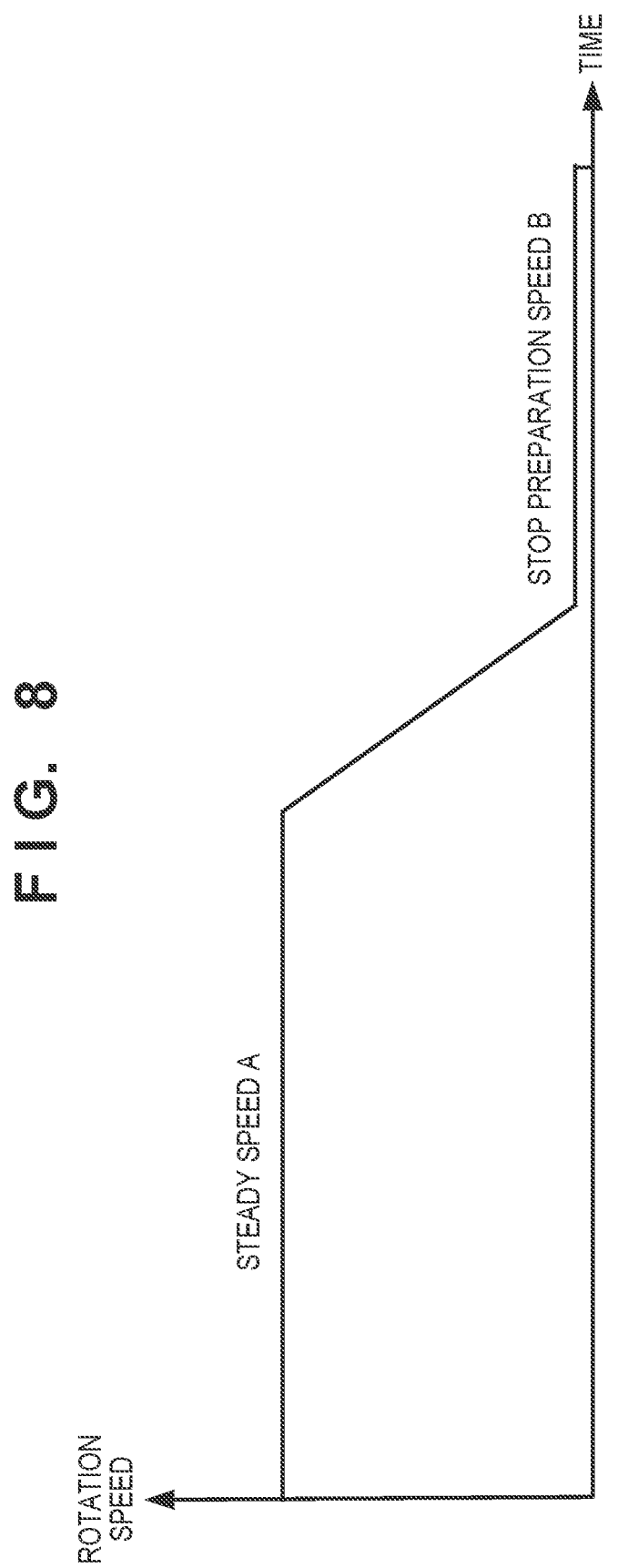

MOTOR CONTROL APPARATUS AND IMAGE FORMING APPARATUS

BACKGROUND OF THE INVENTION

Field of the Invention

The present invention relates to control technology for a motor.

Description of the Related Art

A sensorless type motor (hereinafter, referred to as sensorless motor), which is not equipped with a sensor that detects a rotation position (rotation phase) of a rotor, has been used as a drive source of an image forming apparatus. The motor control apparatus that controls a sensorless motor first detects a stop position of a rotor (rotation phase of a rotor that is stopped) by a predetermined method in activation of the motor. US-2015-0145454 discloses a configuration for detecting a stop position of a rotor by using a characteristic that an inductance value of a coil of a motor changes according to the stop position of the rotor. The motor control apparatus starts driving of the motor by forced commutation control, based on the stop position detected of the rotor. When the rotation speed of the rotor becomes equal to or higher than a predetermined speed, as described in Japanese Patent Laid-Open No. 8-223970, the motor control apparatus can detect the rotation position and the rotation speed of the rotor by an induced voltage generated in a coil. Therefore, after the rotation speed of the rotor becomes equal to or higher than the predetermined speed, the motor control apparatus switches the control method from the forced commutation control to the sensorless control in which the rotation of the rotor is controlled based on the induced voltage generated in the coil.

The drive force of the motor is transmitted to a load via a drive transmission mechanism including a gear train. Since a gear train is generally provided with "play", when the motor stops, the motor can rotate in a direction opposite to a rotation direction of the motor operation, within a range of play provided in the gear train. When rotation of the motor is started in such a state, a time lag occurs from the start of the rotation of the motor until the drive force of the motor is transmitted to a load, and a large load fluctuation occurs when the drive force of the motor is transmitted to the load. This load fluctuation may cause a motor activation failure such as a step-out.

SUMMARY OF THE INVENTION

According to an aspect of the present invention, a motor control apparatus includes: a motor; a transmission mechanism configured to transmit a drive force of the motor to a load of the motor; and a control unit configured to, in case of stopping the motor being rotated at a first speed, decelerate the motor at least at a first deceleration in a first period, in which a rotation speed of the motor is decelerated from the first speed to a second speed lower than the first speed, and decelerate the motor at least at a second deceleration in a second period, in which the motor is decelerated from the second speed until stop, wherein the second deceleration is less than the first deceleration.

Further features of the present invention will become apparent from the following description of exemplary embodiments with reference to the attached drawings.

BRIEF DESCRIPTION OF THE DRAWINGS

FIG. 8 is an explanatory diagram of motor stop processing according to an embodiment.

DESCRIPTION OF THE EMBODIMENTS

Figure 1:
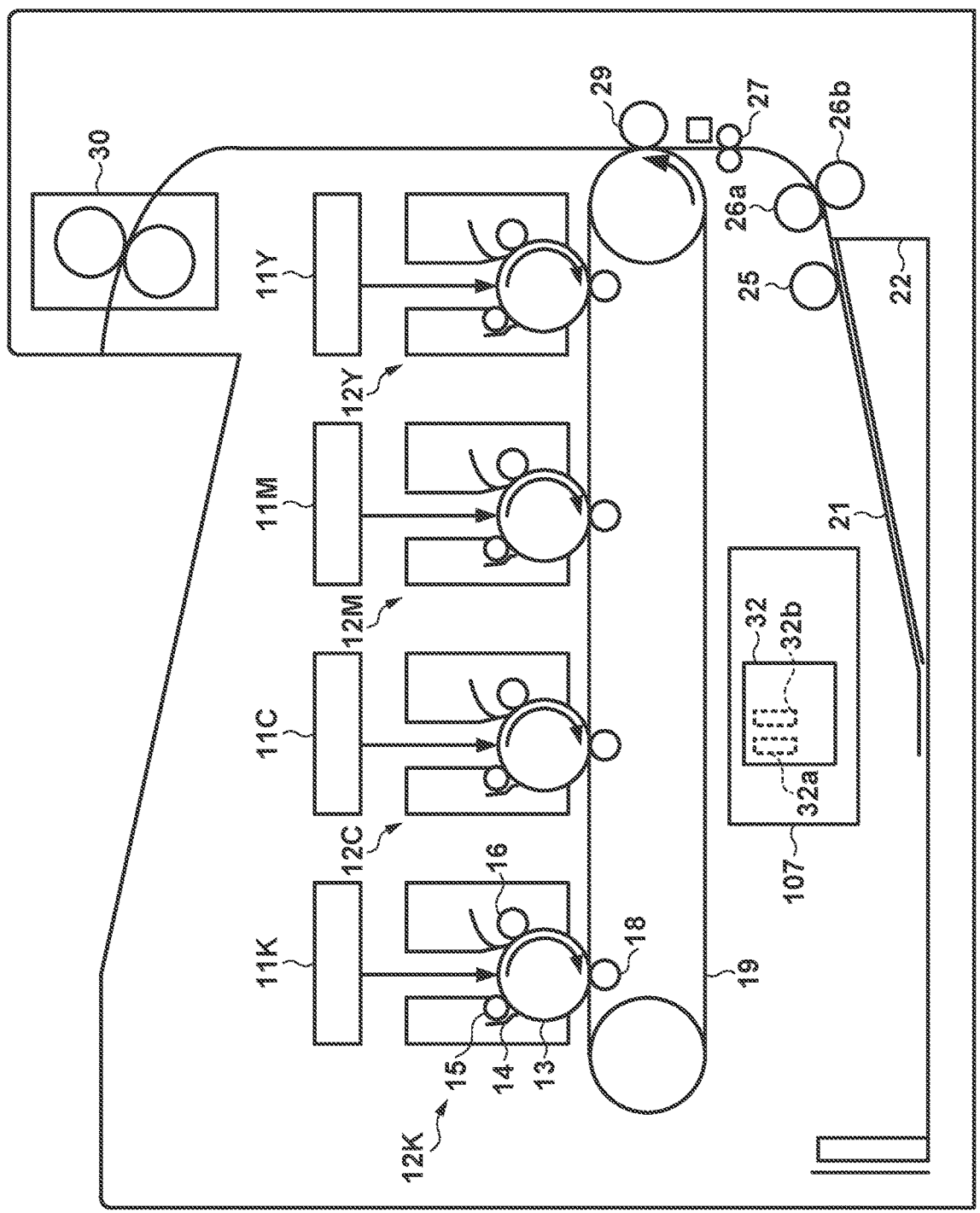
FIG. 1 is a configuration diagram of an image forming apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a configuration diagram of a tandem type color image forming apparatus using an electrophotographic process according to the present embodiment. In FIG. 1, the letters Y, M, C, and K at the end of the reference numerals indicate that the colors of the toner images related to formation by the members indicated by the reference numerals are yellow, magenta, cyan, and black, respectively. In a case where it is not necessary to distinguish the color of the toner image of which the member is involved in formation, reference numerals are used with the last characters omitted. The image forming apparatus includes cartridges 12. Each cartridge 12 is a replacement part of the image forming apparatus, and is configured to be detachable from the body of the image forming apparatus. The configuration of each cartridge 12 is similar, and includes a photoreceptor 13, a charging roller 15, a developing roller 16, and a cleaning blade 14, and contains toner of corresponding color.

The photoreceptor 13 is rotationally driven clockwise in the drawing at the time of image formation. The charging roller 15 charges a surface of the corresponding photoreceptor 13. A scanning unit 11 scans and exposes the surface of the photoreceptor 13 of the corresponding cartridge 12 with light based on image data to form an electrostatic latent image on the photoreceptor 13. By outputting a developing voltage, the developing roller 16 develops the electrostatic latent image on the corresponding photoreceptor 13 with toner, thereby forming a toner image on the corresponding photoreceptor 13. A primary transfer roller 18 outputs primary transfer voltage to transfer the toner image of the corresponding photoreceptor 13 to an intermediate transfer belt 19. The cleaning blade 14 removes the toner that is not transferred to the intermediate transfer belt 19 and is remaining on the photoreceptor 13. Colors different from yellow, magenta, cyan, and black can be reproduced by superimposing and transferring the toner image of the photoreceptor 13 of each cartridge 12 on the intermediate transfer belt 19. The intermediate transfer belt 19 is rotationally driven counterclockwise in the drawing at the time of image formation. Due to this, the toner image on the intermediate transfer belt 19 is conveyed to an opposing position of a secondary transfer roller 29.

On the other hand, a sheet 21 stored in a cassette 22 is fed to a conveyance path by a feeding roller 25. Separation rollers 26a and 26b are provided in order to prevent double feeding of a sheet. The sheet 21 fed to the conveyance path is conveyed to an opposing position of the secondary transfer roller 29 by a registration roller 27. By outputting a secondary transfer voltage, the secondary transfer roller 29 transfers the toner image on the intermediate transfer belt 19 to the sheet 21. Thereafter, the sheet 21 is conveyed to a fixing unit 30. The fixing unit 30 includes a pressurizing roller and a heating roller (heating film), and fixes the toner image to the sheet 21 by pressurizing and heating the sheet 21. After fixing the toner image, the sheet 21 is discharged to the outside of the image forming apparatus.

A printer control unit 107 includes a central processing unit (CPU) 32 and controls the entire image forming apparatus. The printer control unit 107 includes a nonvolatile memory 32a that stores a control program executed by the CPU 32, control data used by the CPU 32 in controlling the image forming apparatus, and the like. The printer control unit 107 includes a volatile memory 32b used as a work area by the CPU 32 when the CPU 32 controls the image forming apparatus. The image forming apparatus includes one or more sensorless motors (not illustrated in FIG. 1) configured to drive rollers and the like, which convey the sheet 21, such as the photoreceptor 13, the intermediate transfer belt 19, the developing roller 16, the pressurizing roller of the fixing unit 30, and the registration roller 27. In the following description, the sensorless motor is simply referred to as "motor".

Figure 2:
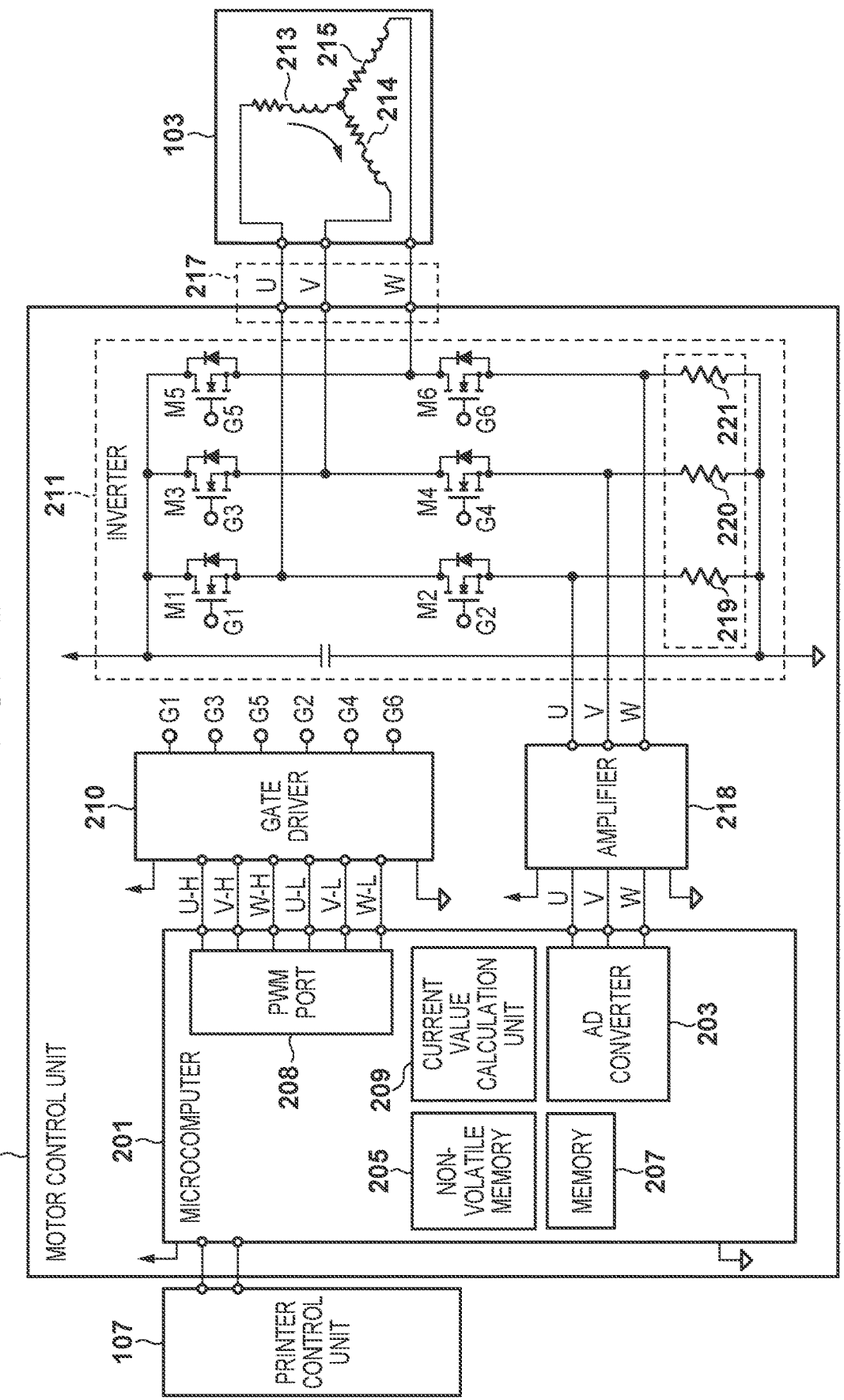
FIG. 2 is a configuration diagram of a motor control unit according to an embodiment.

FIG. 2 illustrates the control configuration of a motor 103 provided in the image forming apparatus. The motor control unit 110 communicates with the printer control unit 107 and controls the motor 103 under control of the printer control unit 107. A nonvolatile memory 205 of a microcomputer 201 stores a program executed by the microcomputer 201 and various kinds of data used for control of the motor 103. The memory 207 is used by the microcomputer 201 for temporary data storage. A PWM port 208 includes a total of six terminals configured to output two PWM signals (high side and low side) with respect to each of three phases (U, V, and W) of the motor 103. That is, the PWM port 208 includes three terminals of the high side (U-H, V-H, and W-H) and three terminals of the low side (U-L, V-L, and W-L).

An inverter 211 includes switching elements M1, M3, and M5 of the high side and switching elements M2, M4, and M6 of the low side, for each of the three phases of the motor 103. In FIGS. 2, M1 and M2 are U-phase switching elements, M3 and M4 are V-phase switching elements, and M5 and M6 are W-phase switching elements. As the switching element, for instance, a transistor or an FET can be used. A gate driver 210 controls ON/OFF of the corresponding switching element, based on the PWM signal from the PWM port 208. For instance, the gate driver 210 controls ON/OFF of the switching element M1 by controlling applied voltage to a gate G1 of the switching element M1, based on the PWM signal output from the U-H terminal.

U-, V-, and W-phase outputs 217 of the inverter 211 are connected to coils 213 (U-phase), 214 (V-phase), and 215 (W-phase) of the motor 103. Coil current flowing through each of the coils 213, 214, and 215 can be controlled by controlling ON/OFF of each of the switching elements. In this manner, the inverter 211 functions as a current supply unit that supplies the coil current to each of the coils 213, 214, and 215. The coil current flowing through each of the coils 213, 214, and 215 is converted into voltage by current detection resistors 219, 220, and 221. An amplifier 218 amplifies the voltage of the current detection resistors 219, 220, and 221 corresponding to the coil current, and outputs amplified voltage to an AD converter 203 of the microcomputer 201. The AD converter 203 converts the voltage output by the amplifier 218 into a digital value. A current value calculation unit 209 determines the current value of the coil current of each phase based on the digital value output from the AD converter 203.

Figure 3:
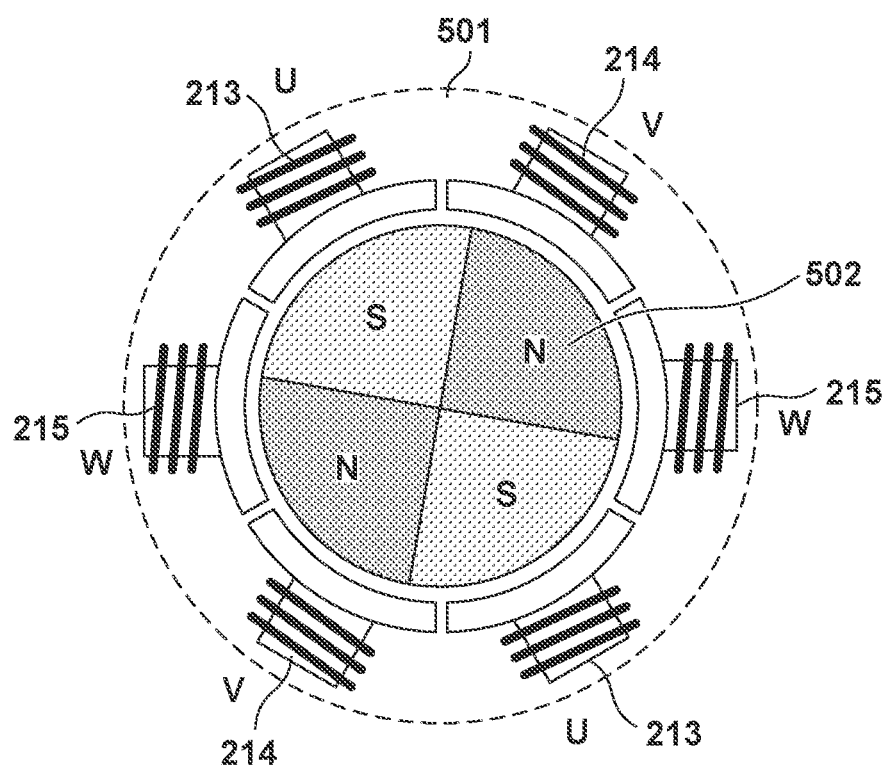
FIG. 3 is a configuration diagram of a motor according to an embodiment.

FIG. 3 is a configuration diagram of the motor 103. The motor 103 includes a stator 501 including six slots, and a rotor 502 including four poles. The stator 501 includes a U-phase coil 213, a V-phase coil 214, and a W-phase coil 215. The rotor 502 is constituted by a permanent magnet. A rotation phase of the rotor 502 is defined based on a case where the rotor 502 is in a predetermined state. As an example, as illustrated in FIG. 3, with reference to a state in which the S pole of the rotor 502 faces the U-phase coil 213, that is, as an electric angle is 0, the rotation phase is defined that an electric angle will increase in counterclockwise. In the present embodiment, since the number of the poles of the rotor 502 is four, in a case where the rotor rotates counterclockwise by a mechanical angle of $\pi/2$ from the state of FIG. 3, an electric angle becomes $\pi$.

Figure 4:
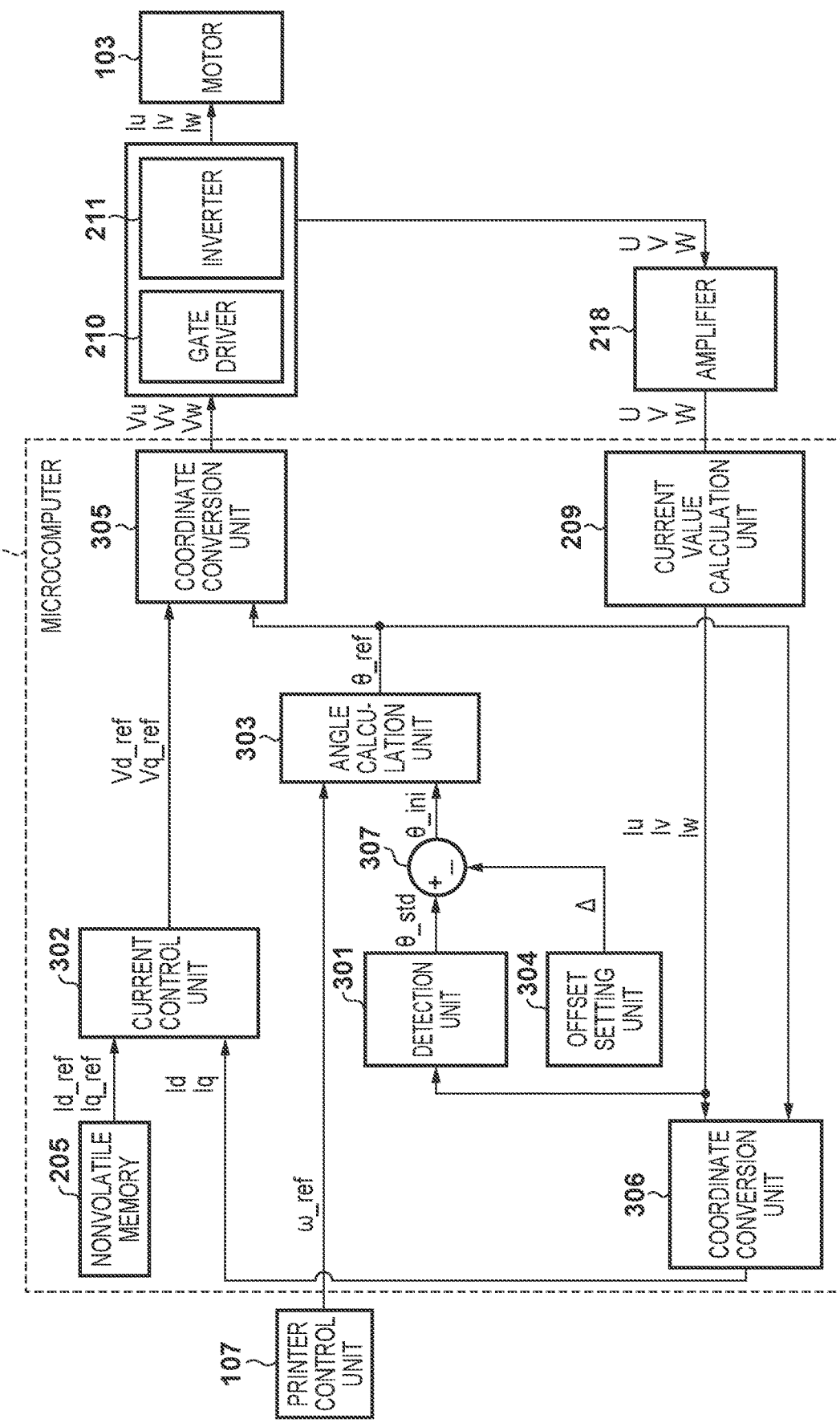
FIG. 4 is a functional block diagram of a microcomputer in forced commutation control according to an embodiment.

FIG. 4 is a functional block diagram of the microcomputer 201 in forced commutation control. Note that in the present embodiment, the microcomputer 201 vector-controls the motor 103. A current control unit 302 acquires a command value Id_ref of excitation current and a command value Iq_ref of torque current that are stored in advance in the nonvolatile memory 205. Additionally, a measurement value Id of excitation current and a measurement value Iq of torque current are input from a coordinate conversion unit 306 to the current control unit 302. Note that the excitation current refers to a component in coil current that contributes to generation of a magnetic flux, and the torque current refers to a component in coil current that contributes to output torque. Based on these values, the current control unit 302 outputs voltage command values Vd_ref and Vq_ref in a rotating coordinate system. A coordinate conversion unit 305 performs coordinate conversion from the rotating coordinate system into a static coordinate system, and further performs two-phase-to-three-phase conversion, and thus generates voltage command values Vu, Vv, and Vw of the U phase, the V phase, and the W phase from the voltage command values Vd_ref and Vq_ref, and outputs the voltage command values Vu, Vv, and Vw. The coordinate conversion from the rotating coordinate system to the static coordinate system is performed based on an electric angle θ_ref output from an angle calculation unit 303. The microcomputer 201 generates the PWM signal to be output to the gate driver 210, based on the voltage command values Vu, Vv, and Vw.

Additionally, current values Iu, Iv, and Iw of U-phase, V-phase, and W-phase coil current detected based on the output of the amplifier 218 by the current value calculation unit 209 are input to the coordinate conversion unit 306. The coordinate conversion unit 306 converts the current values Iu, Iv, and Iw into current values in the static coordinate system by three-phase-to-two-phase conversion, and further performs coordinate conversion from the static coordinate system into the rotating coordinate system, and thus obtains the measurement value Id of excitation current and the measurement value Iq of torque current. The coordinate conversion from the static coordinate system to the rotating coordinate system is performed based on the electric angle θ_ref output from the angle calculation unit 303. The coordinate conversion unit 306 outputs the measurement value Id of excitation current and the measurement value Iq of torque current to the current control unit 302.

At the time of activation of the motor 103, a detection unit 301 determines an initial phase of the rotor 502, that is, an electric angle at the time of stopping (hereinafter, stop angle) θ_std. For detection of the electric angle of the rotor 502 at the time of stopping, for example, the configuration described in US-2015-0145454 can be applied. In this case, the detection unit 301 detects the stop angle θ_std by detecting the inductance of the coils 213, 214, and 215 based on the current values Iu, Iv, and Iw, respectively. The detection unit 301 outputs the detected stop angle θ_std to a subtractor 307. An offset setting unit 304 outputs an offset amount Δ held by the nonvolatile memory 205 to the subtractor 307. The subtractor 307 outputs the electric angle obtained by subtracting the offset amount Δ from the stop angle θ_std to the angle calculation unit 303 as an initial angle θ_ini. The reason why the initial angle θ_ini is set to the electric angle obtained by subtracting the offset amount Δ from the stop angle θ_std is to suppress step-outs at the time of activation.

The angle calculation unit 303 obtains the electric angle θ_ref of the rotor 502 based on the initial angle θ_ini and a speed command value ω_ref input from the printer control unit 107, and notifies the coordinate conversion units 305 and 306 of the electric angle θ_ref. Specifically, the angle calculation unit 303 obtains the electric angle θ_ref of the rotor 502 by increasing the electric angle based on the speed command value ω_ref with the initial angle θ_ini as an initial value.

Figure 5:
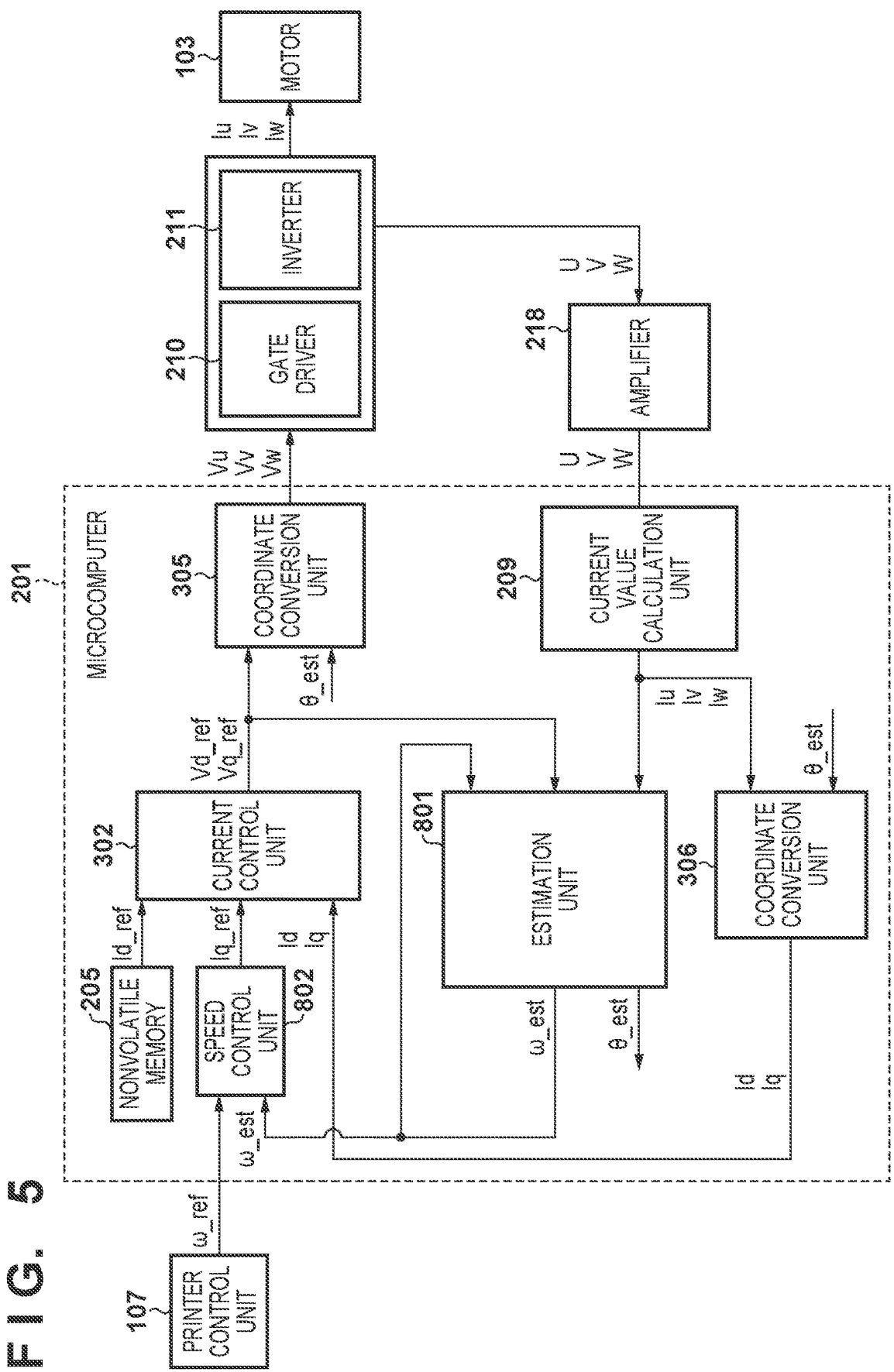
FIG. 5 is a functional block diagram of a microcomputer in sensorless control according to an embodiment.

FIG. 5 is a functional block diagram of the microcomputer 201 in sensorless control. Hereinafter, differences from the functional block diagram in the forced commutation control illustrated in FIG. 4 will be mainly described. An estimation unit 801 estimates an electric angle θ_est and rotation speed ω_est of the rotor 502, based on the current values Iu, Iv, and Iw, the voltage command values Vd_ref and Vq_ref, and the rotation speed ω_est estimated. The electric angle θ_est estimated is used for the coordinate conversion in the coordinate conversion units 305 and 306, as with the case of the forced commutation control. A speed control unit 802 calculates the command value Iq_ref for causing the rotation speed ω_est to follow the speed command value ω_ref, based on the speed command value ω_ref from the printer control unit 107 and the rotation speed ω_est estimated by the estimation unit 801. Unlike in forced commutation control, since the speed control unit 802 calculates the command value Iq_ref and outputs the calculated command value Iq_ref to the current control unit 302, and thus the current control unit 302 acquires and uses only the command value Id_ref from the nonvolatile memory 205.

Figure 6A:
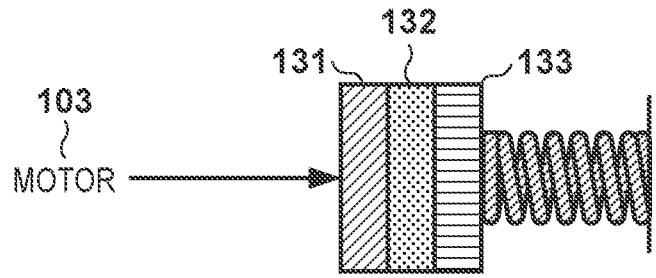
FIGS. 6A to 6D are explanatory diagrams of a drive transmission mechanism of a motor according to an embodiment.
Figure 6B:
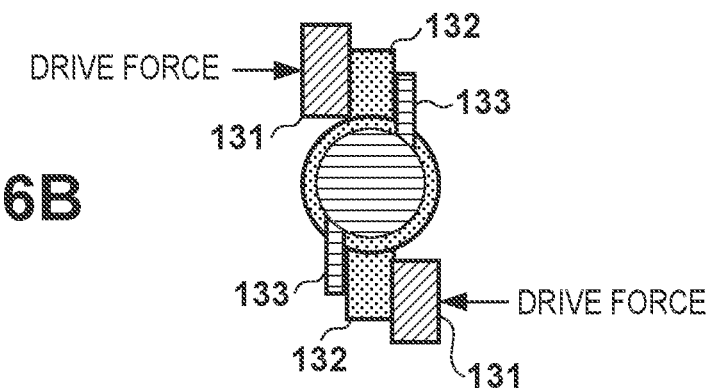

FIGS. 6A to 6D illustrate a drive transmission mechanism that transmits the drive force of the motor 103 to the photoreceptor 13, which is a load. FIGS. 6A and 6B illustrate a state in which the motor 103 rotationally drives the photoreceptor 13. FIG. 6A illustrates a part of FIG. 6B in an enlarged manner. The motor 103 is connected to a gear 131. The gear 131 transmits the drive force of the motor 103 to a coupling 132. The coupling 132 is attached to a rotation shaft of the photoreceptor 13, and the drive force transmitted to the coupling 132 is also transmitted to the photoreceptor 13. The drive force transmitted to the coupling 132 is also transmitted to a torque limiter 133. The torque limiter 133 incorporates a spring that is an elastic member, and a predetermined load is applied to the motor 103 by the spring being contracted. The torque limiter 133 is provided in order to increase a load in a case where the load of the motor 103 (the photoreceptor 13 in this example) is light or the like, thereby stably rotate the load. As illustrated in FIG. 6B, the gear 131, the coupling 132, and the torque limiter 133 are coaxially arranged, and the drive force of the motor 103 is transmitted clockwise in the drawing in order of the gear 131, the coupling 132, and the torque limiter 133.

Figure 6C:
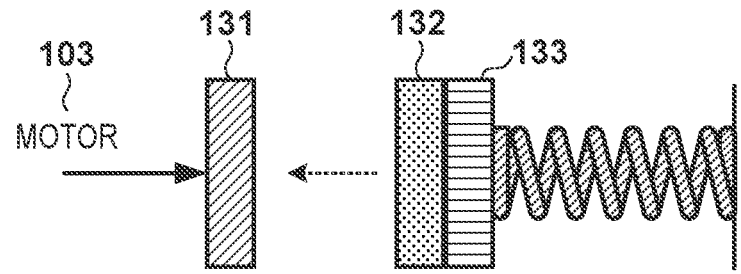
Figure 6D:
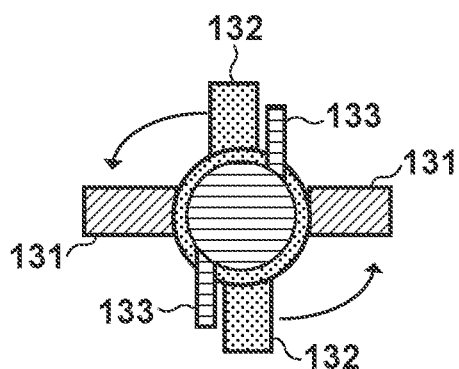

FIGS. 6C and 6D illustrate a state in which the motor 103 is stopped. FIG. 6C illustrates a part of FIG. 6D in an enlarged manner. When the motor 103 is stopped, the spring of the torque limiter 133 that has contracted during rotation is released. When the spring of the torque limiter is released, the coupling 132 and the gear 131 are pushed by the torque limiter 133 in the direction opposite to the rotation direction of the photoreceptor 13 (left side in FIG. 6C and counterclockwise direction in FIG. 6D). Due to this, the motor 103 rotates (reversely rotates) in a direction opposite to the direction in which the photoreceptor 13 is rotated. The amount that the gear 131 can reversely rotate is equal to or less than the "play" amount existing between the gear 131 and the coupling 132, and the stronger the spring pressure of the torque limiter 133 is, the larger the reverse rotation amount of the gear 131 becomes. Since the photoreceptor 13, which is a load, is connected to the coupling 132, the coupling 132 hardly reversely rotates as illustrated in FIG. 6D.

Figure 7A:
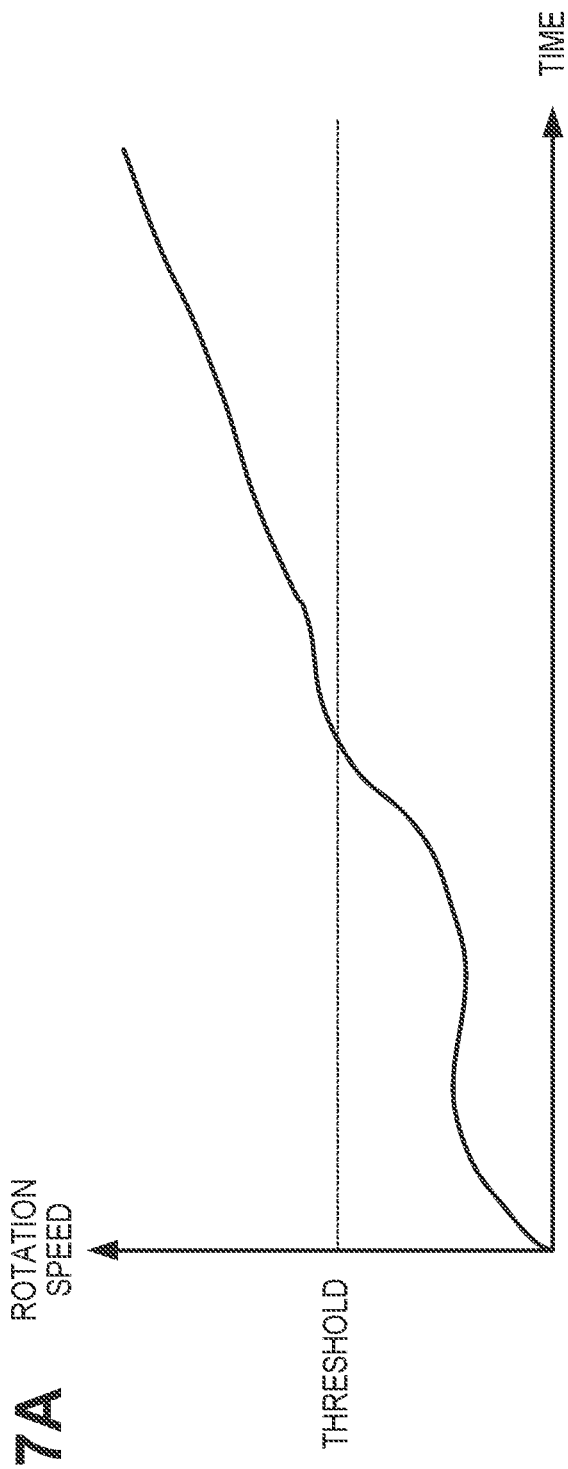
FIGS. 7A and 7B are explanatory diagrams of a reason why an activation failure occurs.

FIG. 7A illustrates a speed change of the motor 103 at the time of activation of the motor 103. The motor 103 is subjected to forced commutation control at the time of activation. When the speed command value ω_ref (FIG. 4) reaches a predetermined threshold, the motor 103 is rotationally driven by the sensorless control. As illustrated in FIGS. 6A and 6B, in the case of activating the motor 103 in a state where the motor 103 has no play with respect to the photoreceptor 13, the rotation speed of the photoreceptor 13 changes similarly to the motor 103 although having a constant ratio depending on the reduction ratio.

Figure 7B:
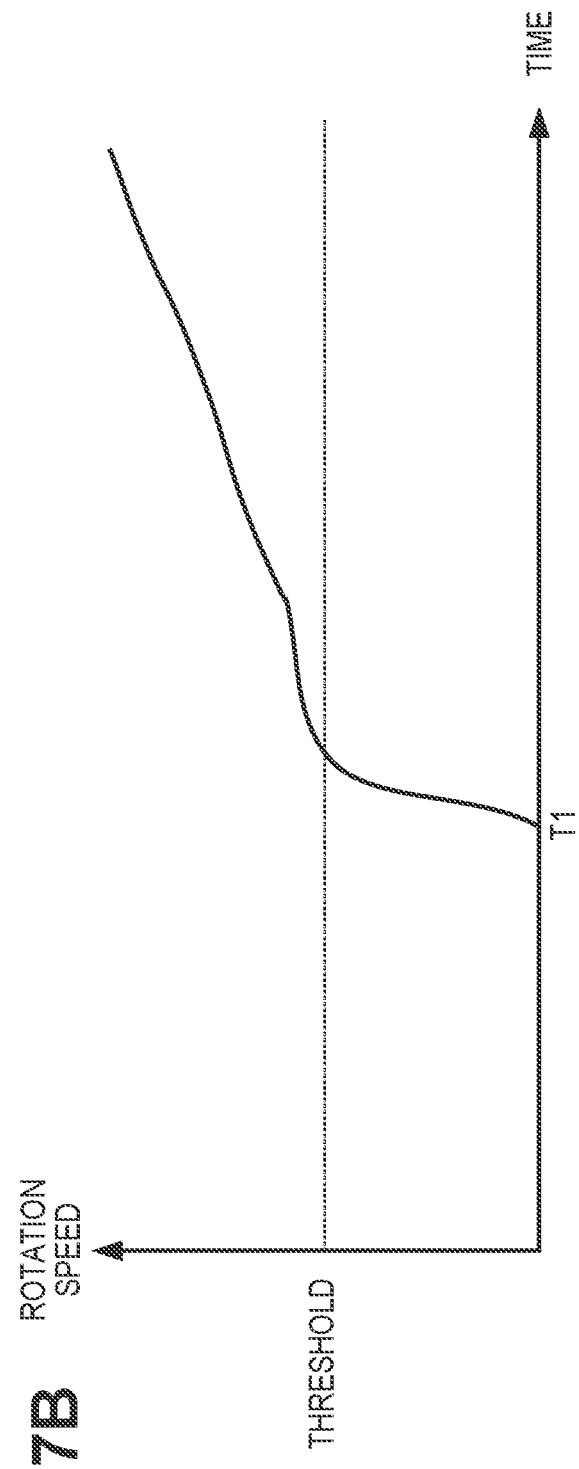

On the other hand, as illustrated in FIGS. 6C and 6D, in the case of activating the motor 103 in a state where the motor 103 has play with respect to the photoreceptor 13, the drive force of the motor 103 is not transmitted to the photoreceptor 13 until the motor 103 is brought into a state of having no play. Then, when the motor 103 is brought into the state of having no play, the rotation speed of the photoreceptor 13 steeply rises according to the speed of the motor 103 at that time. FIG. 7B illustrates a state in which the rotation speed of the photoreceptor 13 steeply rises at timing T1. At this time, since the load of the motor 103 greatly fluctuates, the motor 103 may step out.

As described with reference to FIGS. 6A to 6D, the spring of the torque limiter 133 rotates while contracting during the rotation of the motor 103. When the motor 103 is stopped, the energy accumulated in the spring of the torque limiter 133 during rotation acts in a direction for releasing the spring, thereby causing the motor 103 to reversely rotate. Therefore, by reducing the energy accumulated in the spring while the photoreceptor 13 is rotated, it is possible to reduce the amount of reverse rotation of the motor 103 when the motor 103 is stopped. Therefore, in the present embodiment, when the rotation of the motor 103 is stopped, the motor 103 is rotated for a predetermined time at a rotation speed (hereinafter, referred to as stop preparation speed) lower than the rotation speed (hereinafter, referred to as steady speed) of the motor 103 when the photoreceptor 13 is rotated for image formation. Hereinafter, a detailed description will be given with reference to FIG. 8.

FIG. 8 illustrates a speed change of the motor 103 when the motor is stopped according to the present embodiment. First, the motor 103 is rotating at a steady speed A. The steady speed A is, for example, about 500 rpm to 2500 rpm. While the motor 103 is rotating at the steady speed A, the spring of the torque limiter 133 accumulates a large amount of energy. In stopping the motor 103, the printer control unit 107 first decelerates the speed of the motor 103 to a stop preparation speed B. In the present embodiment, since the stop preparation speed B is lower than the threshold for switching between the sensorless control and the forced commutation control, the motor control unit 110 switches from the sensorless control to the forced commutation control in the middle of deceleration. The stop preparation speed B can be, for example, greater than 0 and 100 rpm or less. As an example, the stop preparation speed B can be 5 rpm or a value in its neighborhood. By rotating at the stop preparation speed B for a predetermined time, a part of the energy accumulated in the spring of the torque limiter 133 is released, and the energy of the spring decreases. The printer control unit 107 stops the motor 103 after rotating the motor 103 at the stop preparation speed B for a predetermined time. At this time, since only energy corresponding to the stop preparation speed B is accumulated in the spring of the torque limiter 133, the amount of reverse rotation of the motor 103 can be reduced after the motor 103 is stopped.

Figure 9:
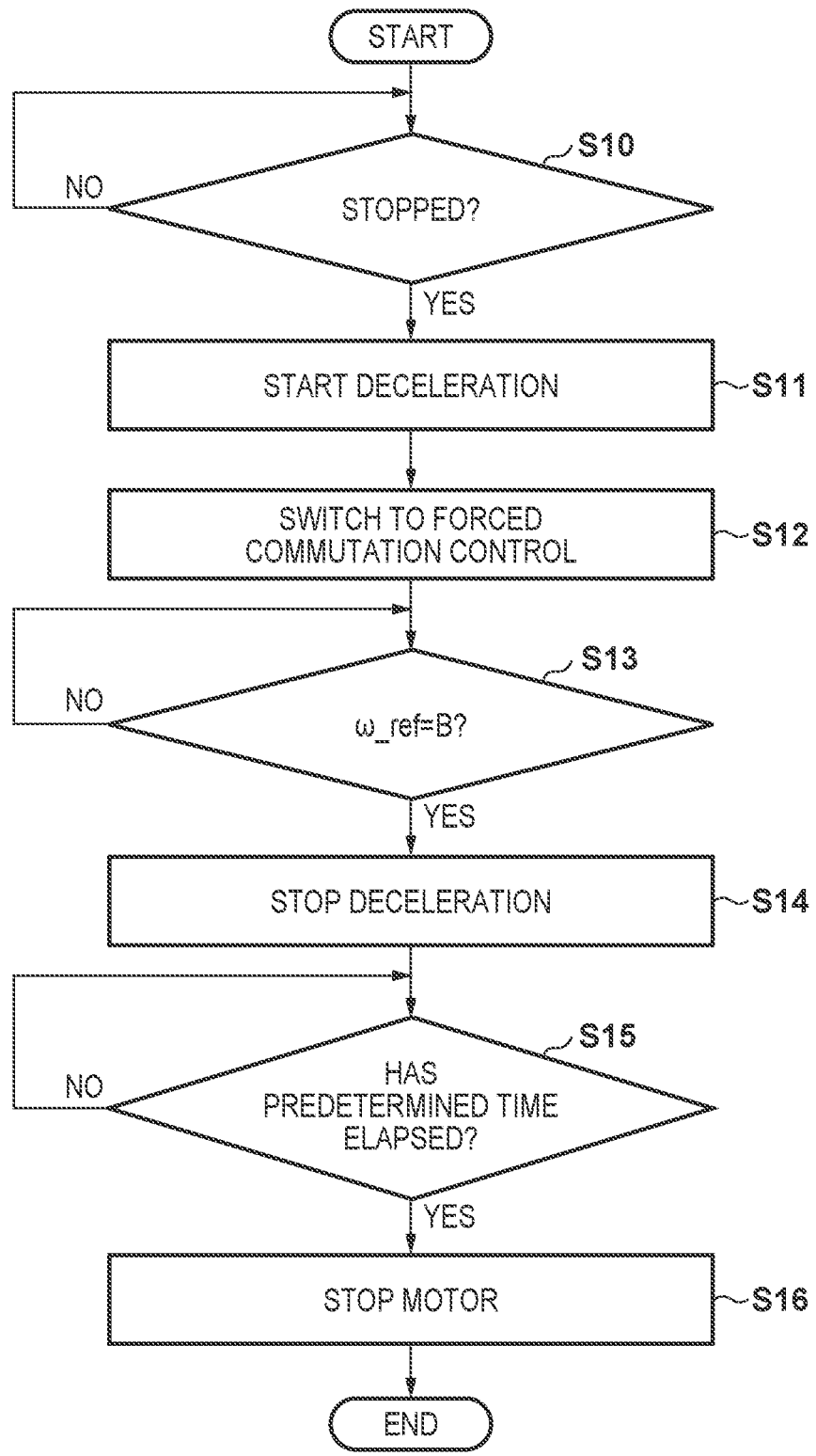
FIG. 9 is a flowchart of motor stop processing according to an embodiment.

FIG. 9 is a flowchart of stop processing of the motor 103 according to the present embodiment. At the start time point of FIG. 9, the printer control unit 107 is rotating the motor 103 at the steady speed A. In S10, the printer control unit 107 waits to stop the motor 103 until, for example, the end of image formation or the like. When an event of stopping the motor 103 occurs, the printer control unit 107 starts, in S11, deceleration of the motor 103 by decreasing the speed command value ω_ref output to the motor control unit 110. When the speed command value ω_ref reaches the threshold for switching between the sensorless control and the forced commutation control, the motor control unit 110 switches to the forced commutation control in S12. Subsequently, in S13, the printer control unit 107 waits until the speed command value ω_ref becomes the stop preparation speed B. When the speed command value ω_ref becomes the stop preparation speed B, the printer control unit 107 maintains, in S14, the speed command value ω_ref indicating the stop preparation speed B, thereby the deceleration of the motor 103 is stopped. When a predetermined time elapses after deceleration to the stop preparation speed B in S15, the printer control unit 107 decreases the speed command value ω_ref in S16, thereby the motor 103 is stopped in S16.

In the present embodiment, in stopping the motor 103 that is rotating at the steady speed A, the rotation speed of the motor 103 is decelerated to the stop preparation speed B, and then the rotation speed is kept constant at the stop preparation speed B for a predetermined time. However, the motor 103 may be configured to be stopped such that, after the rotation speed reached the stop preparation speed B, the deceleration is reduced from the deceleration that is applied until the speed reaches the stop preparation speed B. For example, the deceleration after reaching the stop preparation speed B can be set such that the motor 103 stops after at least a predetermined time elapses. With such a configuration, the energy accumulated in the spring of the torque limiter 133 can be reduced for a predetermined time.

As described above, in stopping the motor 103, after the motor 103 is decelerated to the predetermined stop preparation speed B, the deceleration of the motor 103 is reduced from the deceleration that is applied until the rotation speed of the motor 103 reaches the stop preparation speed B. The deceleration that is applied until the rotation speed reaches the stop preparation speed B can be a maximum value, an average value, or a minimum value of the deceleration in a period until the rotation speed reaches to the stop preparation speed B from the steady speed A. Furthermore, the deceleration that is applied until the rotation speed reaches the stop preparation speed B can be the deceleration immediately before reaching the stop preparation speed B. The deceleration after the rotation speed of the motor 103 reached the stop preparation speed B can be a maximum value, an average value, or a minimum value of the deceleration in the period until the motor 103 stops from the stop preparation speed B. Furthermore, the deceleration after the rotation speed of the motor 103 reached the stop preparation speed B can be the deceleration immediately after the rotation speed of the motor 103 reaches the stop preparation speed B. In an example, when the rotation speed of the motor 103 reaches the stop preparation speed B, the deceleration can be made 0. In this case, when the motor 103 is rotated at the stop preparation speed B for a predetermined time, the motor 103 will be stopped. With this configuration, it is possible to reduce the energy accumulated in the spring of the torque limiter 133 when the motor 103 is stopped, and thus, it is possible to reduce the amount of reverse rotation of the motor 103 after the motor is stopped. By reducing the reverse rotation amount of the motor 103 at the time of stopping, it is possible to prevent an increase in load fluctuation of the motor 103 at the time of next activation, and to prevent activation failure such as a step-out.

While in the present embodiment, the stop preparation speed B is a speed at which only forced commutation control can be used, the stop preparation speed B only needs to be lower than the steady speed A, and may be a speed at which sensorless control can be used. The motor 103 of the present embodiment is a brushless motor controlled by sensorless vector control, but may be another type of motor such as a stepping motor that operates by forced commutation control. FIGS. 6A to 6D are examples of the drive transmission mechanism of the motor 103, and the present invention can also be applied to drive transmission mechanisms different from that of FIGS. 6A to 6D. Specifically, the present invention can be applied to a configuration in which an elastic body such as a spring or a roller is included in a drive transmission mechanism or a load of the motor 103 and the drive transmission mechanism is provided with "play".

Second Embodiment

Figure 10:
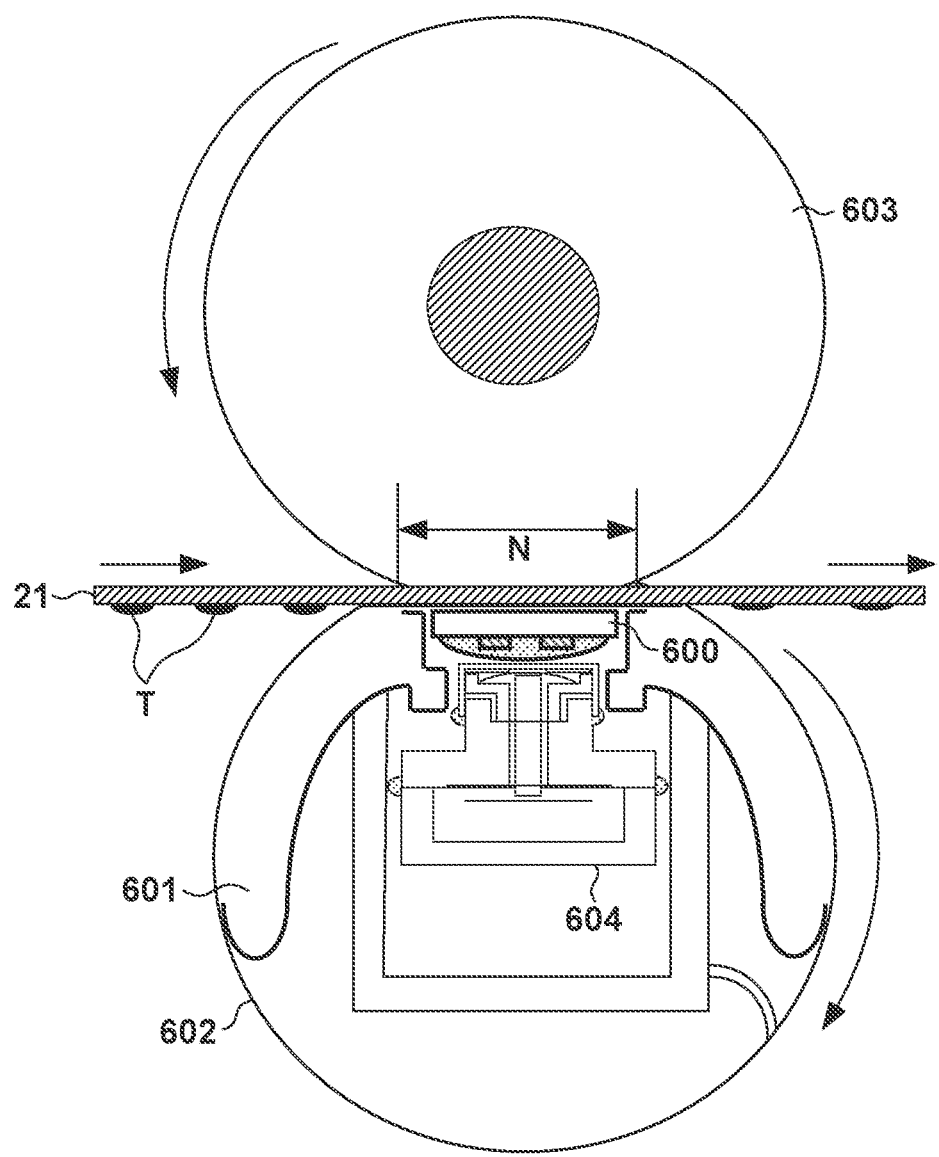
FIG. 10 is a configuration diagram of a fixing unit according to an embodiment.

Next, a second embodiment will be explained mainly on differences from the first embodiment. FIG. 10 is a cross-sectional view of the fixing unit 30. The fixing unit 30 illustrated in FIG. 10 includes a fixing film 602 (fixing roller), which is a cylindrical film, and a pressurizing roller 603. Inside of the fixing film 602 is provided with a heater 600, a heater holder 601, which fixedly holds the heater 600 and is in contact with a heating element of the heater 600, and a thermistor 604 configured to measure temperature. The pressurizing roller 603 is rotationally driven counterclockwise in the drawing by a motor 104 similar to the motor 103 of the first embodiment. Due to pressure contact frictional force in a fixing nip region N with the outer surface of the pressurizing roller 603 and the fixing film 602, the rotational force of the pressurizing roller 603 acts on the fixing film 602, and the fixing film 602 is in the driven rotation state.

The heater 600 is temperature-controlled to a predetermined temperature based on the temperature measurement result of the thermistor 604. In that state, the sheet 21 carrying an unfixed toner image T is conveyed in the fixing nip region N. In the fixing nip region N, the toner image carrying surface side of the sheet 21 is brought into close contact with the outer surface of the fixing film 602, and the fixing nip region N is nipped and conveyed together with the fixing film 602. In this nipping and conveying process, heat of the heater 600 is applied to the sheet 21 via the fixing film 602, and the unfixed toner image T on the sheet 21 is heated and pressurized to be melted and fixed.

Figure 11:
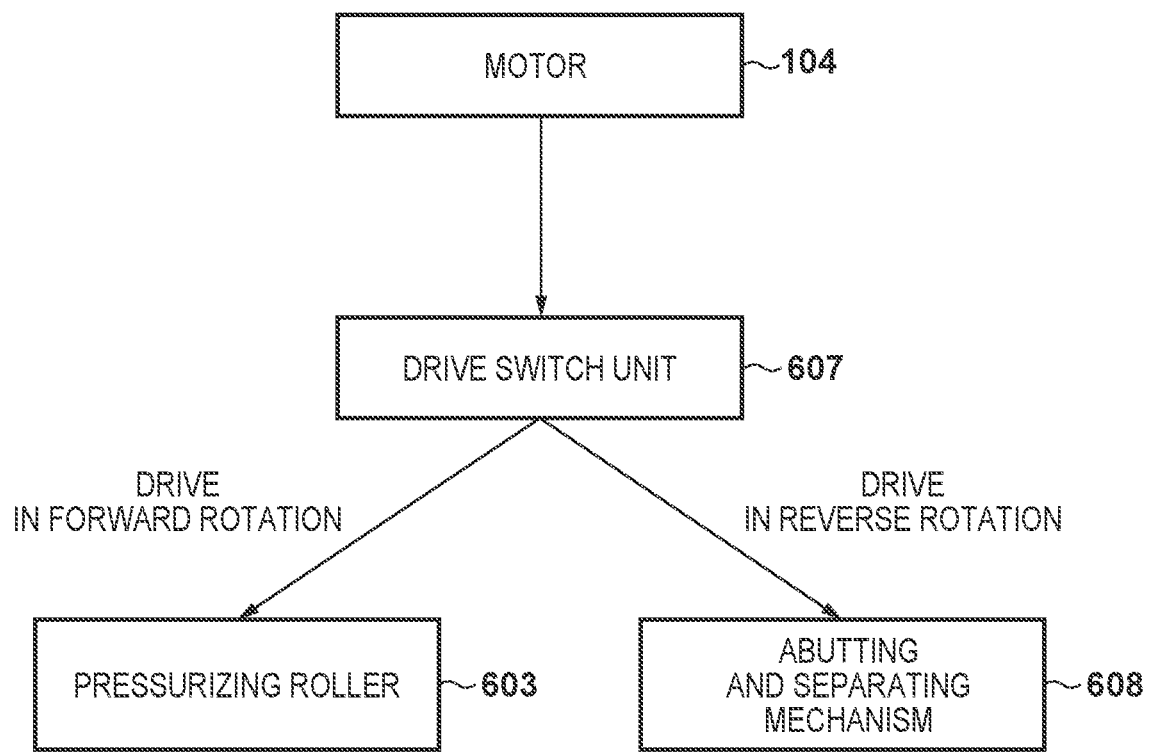
FIG. 11 is a drive configuration diagram of a motor according to an embodiment.

FIG. 11 illustrates the drive configuration of the motor 104 according to the present embodiment. The configuration of the motor 104 and the control configuration of the motor 104 are similar to those described with reference to FIGS. 2 to 5. When the motor 104 is rotated forward, a drive switch unit 607 transmits the drive force to the pressurizing roller 603. On the other hand, when the motor 104 is reversely rotated, the drive switch unit 607 transmits the drive force of the motor 104 to an abutting and separating mechanism 608.

The abutting and separating mechanism 608 switches between an abutting state in which the fixing film 602 and the pressurizing roller 603 abut each other and a separation state in which the fixing film 602 and the pressurizing roller 603 are separated from each other. Specifically, when the motor 104 is reversely rotated by a predetermined amount when in the separation state, the abutting and separating mechanism 608 brings the pressurizing roller 603 and the fixing film 602 into the abutting state by using a cam not illustrated. When the motor 104 is further reversely rotated by a predetermined amount, the abutting and separating mechanism 608 brings the pressurizing roller 603 and the fixing film 602 into the separation state. A sensor that detects whether to be in the abutting state or in the separation state is further provided. For example, when the power of the image forming apparatus is turned off or when the image forming apparatus transitions to the sleep mode, the image forming apparatus brings the pressurizing roller 603 and the fixing film 602 into the separation state. This prevents a setting mark or the like from remaining on the fixing film 602 and from causing an image defect.

Since the pressurizing roller 603 is an elastic body, when the motor 104 is stopped, the force in the direction of eliminating twist during rotating of the pressurizing roller 603 is transmitted to the drive switch unit 607 via the drive transmission mechanism. The motor 104 may reversely rotate upon receiving the force from the pressurizing roller 603 due to the play provided in the drive switch unit 607. Therefore, as described in the first embodiment, a step-out may occur when the pressurizing roller 603 is suddenly connected to the motor 104 at the time of activation of the motor 104.

Therefore, when the rotation of the motor 104 is stopped, as described with reference to FIG. 8, the motor 104 is stopped after being rotated at the stop preparation speed B for a predetermined time. This configuration makes it possible to reduce the energy accumulated in the elastic body of the pressurizing roller 603, and to reduce the amount of reverse rotation of the motor 104 at the time of stopping.

Additional Notes

Note that in each of the above-described embodiments, the motor control unit 110 is described as a component of the image forming apparatus, but the motor control unit 110 can be a motor control apparatus as one apparatus. Additionally, an apparatus including the printer control unit 107 and the motor control unit 110 can be a motor control apparatus. As described above, the present invention can be applied to a configuration in which at least one of the drive transmission mechanism and the load includes an elastic body and the drive transmission mechanism is provided with play, and the type of the load of the motor is arbitrary. Therefore, the present invention can be applied to control of a motor that drives an arbitrary member such as a motor that drives an image forming unit related to image formation such as the cartridge 12 or the intermediate transfer belt 19, or a motor that drives a roller (rotating member) configured to convey the sheet 21. As an example, the load of the motor can be one or more of the photoreceptor 13, the developing roller 16, the intermediate transfer belt 19, the pressurizing roller 603 of the fixing unit 30, and the roller configured to convey the sheet 21. The configuration of the motor 103 is not limited to the configuration illustrated in FIG. 3, and may be a motor having another number of poles or phases.

Other Embodiments

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-010362, filed Jan. 26, 2022, which is hereby incorporated by reference herein in its entirety.

What is claimed is:

1. A motor control apparatus comprising:
a motor;
a transmission mechanism configured to transmit a drive force of the motor to a load of the motor; and
a control unit configured to, in case of initiating a stopping procedure of the motor being rotated at a first speed, decelerate the motor at least at a first deceleration in a first period, in which a rotation speed of the motor is decelerated from the first speed to a second speed lower than the first speed, and decelerate the motor at least at a second deceleration in a second period, in which the motor is decelerated from the second speed until the motor stops, wherein
the second deceleration is less than the first deceleration,
the control unit is configured to perform a first control on the motor when the rotation speed of the motor is greater than a threshold, and perform a second control on the motor when the rotation speed of the motor is less than the threshold,
the second speed is a speed less than the threshold,
the first control is control based on an induced voltage generated in the motor, and
the second control is control not based on the induced voltage.

2. The motor control apparatus according to claim 1, wherein the second period is a predetermined period or more.

3. The motor control apparatus according to claim 1, wherein the control unit is configured to, after the rotation speed of the motor reaches the second speed, rotate the motor at the second speed for a predetermined period before stopping the motor.

4. The motor control apparatus according to claim 1, wherein the first speed is a speed greater than the threshold.

5. The motor control apparatus according to claim 1, wherein the second control is forced commutation control.

6. The motor control apparatus according to claim 1, wherein the second speed is greater than 0 and equal to or less than 100 rpm.

7. The motor control apparatus according to claim 1, wherein at least one of the load and the transmission mechanism includes an elastic body.

8. The motor control apparatus according to claim 1, wherein the transmission mechanism has play.

9. The motor control apparatus according to claim 1, wherein the motor is a sensorless motor.

10. The motor control apparatus according to claim 1, wherein the motor is a stepping motor.

11. A motor control apparatus configured to control a motor that is configured to transmit a drive force to a load by a transmission mechanism, the motor control apparatus comprising:
a control unit configured to, in case of initiating a stopping procedure of the motor being rotated at a first speed, decelerate the motor at least at a first deceleration in a first period, in which a rotation speed of the motor is decelerated from the first speed to a second speed lower than the first speed, and decelerate the motor at least at a second deceleration in a second period, in which the motor is decelerated from the second speed until the motor stops, wherein
the second deceleration is less than the first deceleration,
the control unit is configured to perform a first control on the motor when the rotation speed of the motor is greater than a threshold, and perform a second control on the motor when the rotation speed of the motor is less than the threshold,
the second speed is a speed less than the threshold,
the first control is control based on an induced voltage generated in the motor, and
the second control is control not based on the induced voltage.

12. An image forming apparatus comprising:
a rotating member configured to convey a sheet along a conveyance path;
an image forming unit configured to form an image on the sheet conveyed through the conveyance path;
a motor configured to drive the rotating member or the image forming unit;
a transmission mechanism configured to transmit a drive force of the motor to a load of the motor; and
a control unit configured to, in case of initiating a stopping procedure of the motor being rotated at a first speed, decelerate the motor at least at a first deceleration in a first period, in which a rotation speed of the motor is decelerated from the first speed to a second speed lower than the first speed, and decelerate the motor at least at a second deceleration in a second period, in which the motor is decelerated from the second speed until the motor stops, wherein
the second deceleration is less than the first deceleration, wherein
the load includes at least one of a photoreceptor of the image forming unit, a developing roller, in the image forming unit, that forms a toner image on the photoreceptor by developing an electrostatic latent image formed on the photoreceptor, an intermediate transfer belt, in the image forming unit, to which the toner image formed on the photoreceptor is transferred, a roller, in the image forming unit, that fixes the toner image transferred from the intermediate transfer belt to the sheet, and the rotating member that conveys the sheet.

13. The image forming apparatus according to claim 12, wherein the second period is a predetermined period or more.

14. The image forming apparatus according to claim 12, wherein the control unit is configured to, after the rotation speed of the motor reaches the second speed, rotate the motor at the second speed for a predetermined period before stopping the motor.

15. The image forming apparatus according to claim 12, wherein the first speed is a speed greater than the threshold.

16. The image forming apparatus according to claim 12, wherein the second control is forced commutation control.

17. The image forming apparatus according to claim 12, wherein the second speed is greater than 0 and equal to or less than 100 rpm.

18. The image forming apparatus according to claim 12, wherein at least one of the load and the transmission mechanism includes an elastic body.

19. The image forming apparatus according to claim 12, wherein the transmission mechanism has play.

20. The image forming apparatus according to claim 12, wherein the motor is a sensorless motor.

21. The image forming apparatus according to claim 12, wherein the motor is a stepping motor.

\* \* \* \* \*